F. L. EAGER.
TROLLEY WHEEL AND HARP.
APPLICATION FILED OCT. 3, 1906.
936,100.
Patented Oct. 5, 1909.
2 SHEETS—SHEET 1.
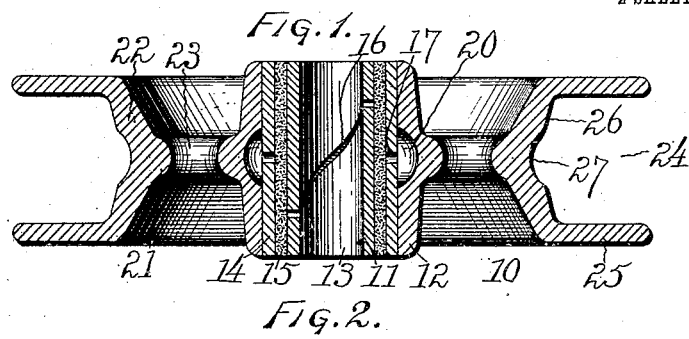
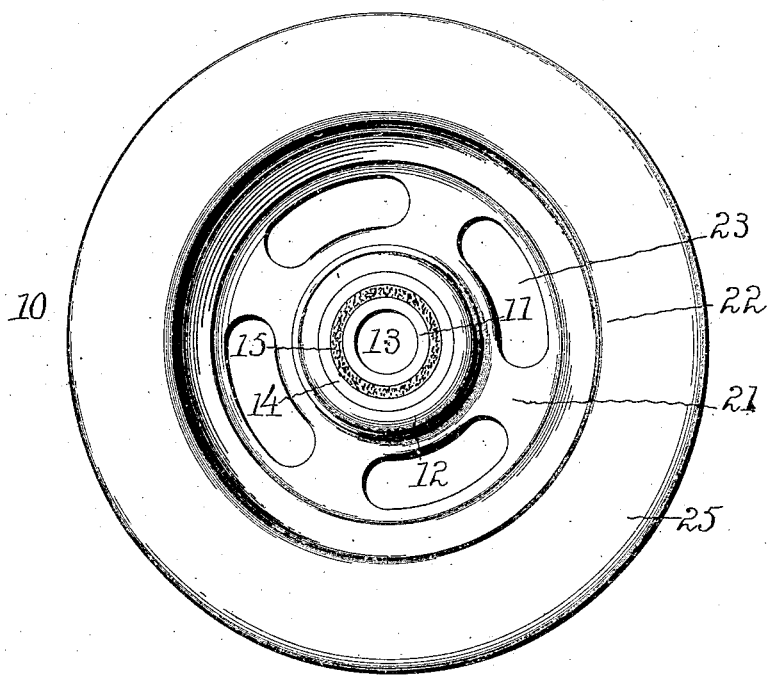
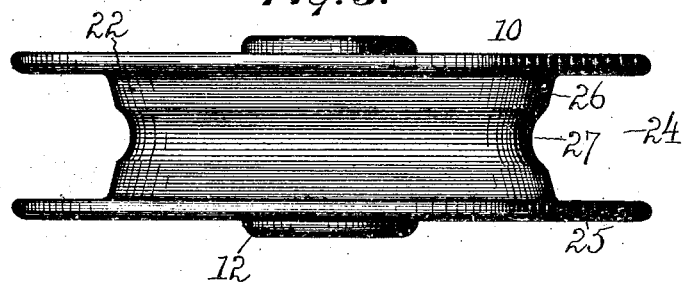
WITNESSES:
INVENTOR:
Frank L. Eager,
PER
Arthur B. Jenkins.
ATTORNEY.

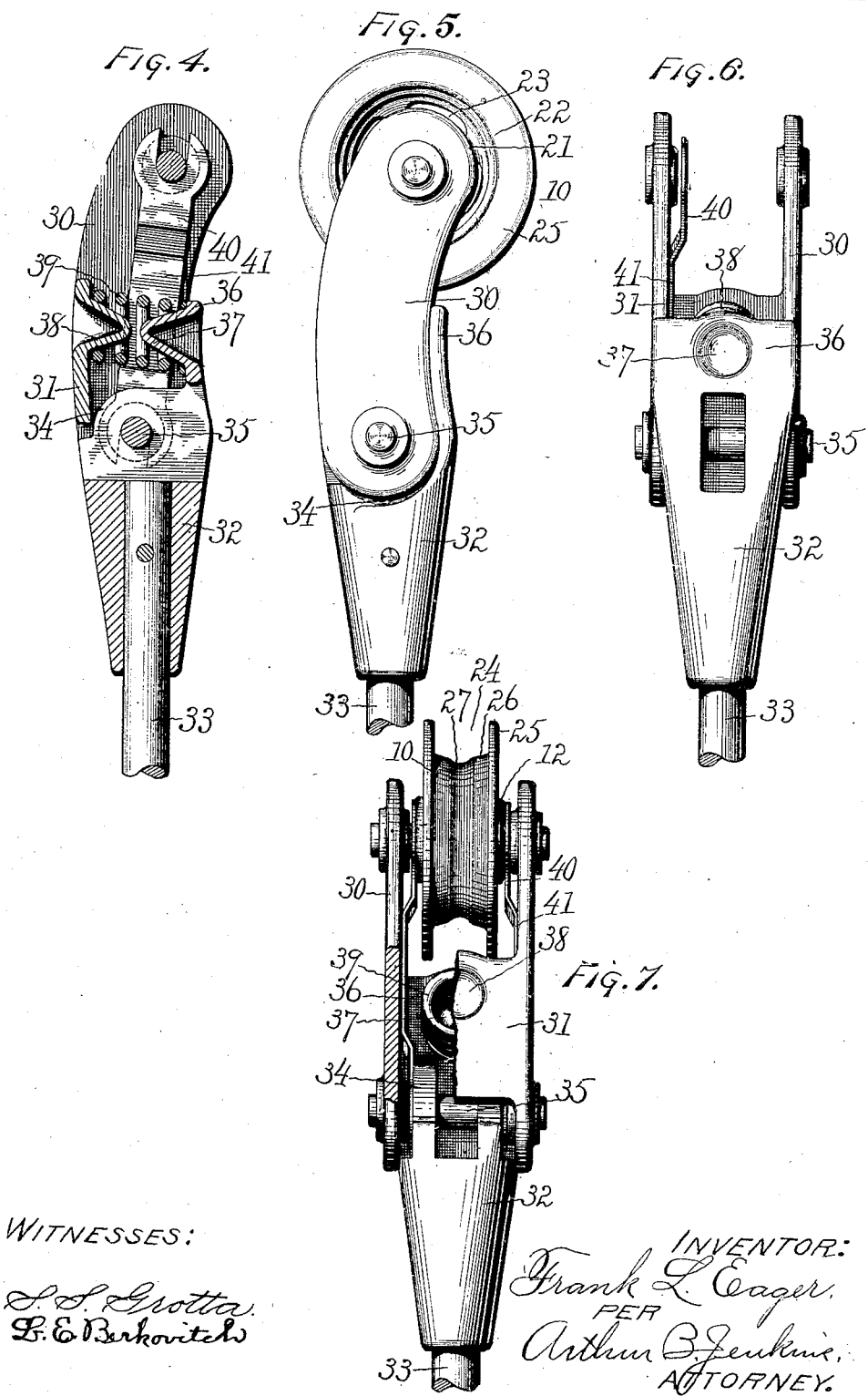

UNITED STATES PATENT OFFICE.

FRANK L. EAGER, OF WATERBURY, CONNECTICUT.

TROLLEY WHEEL AND HARP.

936,100.  Specification of Letters Patent.  Patented Oct. 5, 1909.

Application filed October 3, 1906. Serial No. 337,200.

*To all whom it may concern:*

Be it known that I, FRANK L. EAGER, a citizen of the United States, and a resident of Waterbury, in the county of New Haven and State of Connecticut, have invented a new and Improved Trolley-Wheel and Harp Therefor, of which the following is a specification.

My invention relates to the class of devices for conducting a current of electricity from a wire for delivery to the motor of a vehicle, such device including as part of the structure a rotating part, and the object of my invention is to provide a trolley wheel which may be used for a maximum length of time and one in which injury to overhead construction shall be lessened; and a further object of the invention is to provide a device having improved conducting means for the electric current. A form of device in the use of which these objects may be attained is illustrated in the accompanying drawings, in which—

Figure 1 is a view in central section of a trolley wheel embodying my invention. Fig. 2 is a side view of the same. Fig. 3 is an edge view. Fig. 4 is a view in lengthwise central section through the trolley harp. Fig. 5 is a side view of the same with my improved wheel therein. Fig. 6 is a bottom view, the trolley wheel being removed. Fig. 7 is a top view partially broken away to show construction.

In the accompanying drawings the numeral 10 denotes my improved trolley wheel having a central opening 11 for the reception of the spindle upon which the wheel turns. This opening is formed in the hub 12, or rather within a bushing located within the hub. This bushing includes an inner member 13 and an outer member 14 having a filling 15 of graphite or other similar material located between them. A spiral groove 16 is located in the inner member, and openings 17 extend through the wall of the outer member of the bushing. This general form of construction of bearing is old in prior devices. In these prior devices, however, an opening has been formed through the hub of the wheel in which has been secured a device for introduction of the oil from the outside.

In carrying out my invention I provide a chamber 20 preferably consisting of a groove extending about the inner surface of the hub. When the bushing is inserted in place this chamber is entirely closed. A plastic lubricant may be deposited in this chamber before the bushing is secured in place, and should the hub become heated beyond a certain degree this lubricant will be melted or softened so that it will permeate through the filling and flow to the inner surface of the inner member 11 of the bushing.

Heretofore in the construction of trolley wheels a V-shaped groove has been formed in the periphery of the wheel. Under the usual conditions of use of these devices the wheel is pressed against the trolley wire so that the latter is located in the bottom of this groove and the wear soon causes a channel of a width practically equal to the diameter of the wire to extend downward from what was originally the bottom of this groove. When this channel is worn to but a short distance the action of the wheel in traveling around a curve causes the wire to be cramped within this comparatively narrow channel. The raising of the trolley wheel caused by this groove also permits contact of the hangers of the overhead work with the trolley wheel, much to the injury of the former. In devising my improved wheel I have provided means whereby the wear upon the wheel will produce a channel of considerable width which will prevent cramping of the trolley wire as the wheel passes a curve and also the contact with the overhead hangers.

In carrying out my invention the wheel is cast of any usual and proper metal, having formed thereon the hub 12 and a web 21 may be located between the hub and the rim 22. Openings 23 may be formed in the web for the purpose of securing lightness. A groove 24 is formed in the rim, flanges 25 forming the groove to a large extent. These flanges are located at such distance apart that a groove of a dimension considerably in excess of that of the diameter of the trolley wire is provided. The walls of this groove are parallel, or practically so, for the greater part of the depth of the groove. The bottom of the groove is formed by inclined parts 26 sloping downward to a channel 27. The sloping parts 26 do not deviate greatly from a line at right-angles to the parallel walls of the groove, but are so located as to lead a wire therefrom to the channel 27, when it shall become displaced from the latter. The channel 27 is preferably formed on the arc of a circle somewhat greater than that of the trolley wire, this referring to the cross-sectional form. The inclined sides of the channel 27 are therefore steeper with respect to the sides of the groove 24 than is the incline of the parts 26 of the groove 24 with respect to its sides. It will be seen from this construction that as the trolley wheel is turned in its travel around a curve, thus locating the wire transversely to the groove in the wheel, the edges of the channel 27 will be gradually worn off, and this effect will be produced in the continual wear, the wire, under these circumstances having a certain freedom of movement whereby it may for the time being escape from the channel 27. This movement will wear the edges of the channel 27, the effect of which will be to maintain the width of the channel as it increases in depth.

The wheel 10 is mounted in a yielding carrier including side parts 30 rigidly united by a cross-piece 31, this carrier forming a portion of the trolley harp which also includes a base piece 32 secured to the trolley pole 33. In the form shown an opening is made in the base into which the trolley pole projects and is secured. The base 32 has ears 34 within which the pin 35 for pivotally uniting the carrier to the base is located. In order to secure lightness two ears are properly provided. A lip 36 forms a portion of the base and a spring engaging lug 37 projects from this lip. A similar lip engaging lug 38 projects from the cross-piece 31, and a spring 39 is held in place by these lugs, the spring, by pressure upon the carrier, tending to hold the latter at the opposite limit of its play from that shown in Figs. 4 and 5 of the drawings, the spring being under compression as shown in these views. The pin 35, forming the means of connection between the carrier and the base of the harp, will make a poor conductor for the current of electricity between the parts, one of which is movably supported with respect to the other, this poor conductivity depending partially upon the imperfect fit between the pin and its bearings and also by reason of the coating of oil, rust or the like which is liable to accumulate on the pin.

In order to obtain good conductivity between the trolley wheel 10 and the pole 33 I provide the contacts 40. These contacts have an offset portion 41 located between its ends, this offset portion constituting a spring seat, forming a spring for holding the ends of the contact securely against the trolley wheel 10 and also against the ears 34 on the base of the harp, thus maintaining a secure contact. The turning of the trolley wheel will maintain the parts clean and bright at this point of contact, and the movement of the carrier on its pivot will maintain the parts clean and bright at the point of contact between the carrier and spring and also between the ears 34 and spring, the contact being freely movable at all points of pressure.

It will be noted, as plainly shown in Figs. 4 and 7, that the ends of each of the contacts 40 are of exactly the same shape, the grooves in the ends being of the same size and each end being offset to the same extent as the opposite end. This provides a construction whereby the contact may be reversed end for end as will be readily apparent from an inspection of said Figs. 4 and 7.

While I have shown and described herein the inclined part 26 of the groove extending for a short distance in a straight line, I do not limit myself to this exact structure of the bottom of said groove, as such bottom may be formed other than on straight lines and yet be within the scope and intent of the invention.

What I claim as my invention and desire to secure by Letters Patent is:—

1. A trolley wheel including a hub and a rim connected therewith, said rim having a groove with a bottom located at an angle to and sloping slightly toward the center of the wheel from said side walls, the part of the rim containing the groove being formed in a single piece, said sloping bottom terminating in a channel arranged to provide an angle between said channel and the sloping bottom.

2. A trolley wheel including a hub and a rim, the latter having a groove therein formed by flanges disposed practically parallel to each other, the part of the rim containing the groove being formed in a single piece, said groove having a bottom inclined slightly inward toward the center of the wheel and terminating in a channel formed to produce an angle between said channel and the sloping side walls.

3. A trolley wheel including a hub and a rim connected therewith, said rim having a groove, the part of the rim containing the groove being formed in a single piece, said groove having a bottom located at an angle to and sloping slightly toward the center of the wheel from the side walls, and with a channel located between the bottom portions of the groove.

4. A trolley wheel including a hub and a rim connected therewith, said rim having a groove including side parts located practically parallel each with the other and formed of a single piece, and a bottom sloping but slightly toward the center of the wheel, said bottom terminating in a channel the sides of which are steeper than the bottom of said groove.

5. A hub, a rim, a web connecting said rim and hub, said web having openings laterally therethrough and arranged to provide a rib on the under surface of the rim, said rib reinforcing a groove in the rim with a channel located opposite said rib and a bottom wall inclined slightly outward from the center of the wheel in opposite directions from said channel, and side parts located at an angle to the sloping bottom parts, the part of the rim containing the channel being formed in a single piece.

6. A base for a trolley harp, a carrier mounted on said base and movably secured thereto, a trolley wheel mounted in the carrier, and a spring contact extending from said trolley wheel to the base and in close movable contact with each of said parts.

7. A base for a trolley harp, a carrier movably secured to the base, a trolley wheel mounted in the carrier, and a contact formed to press closely against the trolley wheel, the carrier, and the base, and in movable contact with a plural number of said parts.

8. A base for a trolley harp having ears projecting therefrom, a carrier with side parts located outside of said ears, a trolley wheel mounted in the carrier, and contacts pressing closely against said wheel, the side parts of the carrier and said ears.

9. A base for a trolley harp, said base having ears, a pin mounted in said ears, a carrier including side parts mounted on said pin, a trolley wheel mounted in said carrier, and a contact pressing closely against the side of said wheel, side parts and ears.

10. A base for a trolley harp, said base having ears, a pin mounted in said ears, a carrier having side parts supported on said pin, a trolley wheel mounted in said carrier, and a contact having forked ends engaging the trolley wheel and carrier pin and with an offset center pressing against the side parts of said carrier.

11. A base for a trolley harp, a carrier pivotally mounted on said base, a trolley wheel mounted in the carrier, and a spring contact extending from said trolley wheel to the base and in movable contact with each of said parts.

12. A base for a trolley harp, a carrier pivotally mounted on said base, a trolley wheel mounted in the carrier, and a spring contact extending from said trolley wheel to the base and held by the pivots of the trolley wheel and carrier.

13. A base for a trolley harp, a carrier mounted on the base and movably connected therewith, a trolley wheel mounted in the carrier, and a spring contact extending between the wheel and base, said contact being reversible end for end.

14. A base for a trolley harp, a carrier mounted on said base and movably connected therewith, a trolley wheel mounted on the carrier, and a contact extending between the trolley wheel and base and in close contact with each of said parts, said contact being reversible end for end with either end arranged to securely engage against the trolley wheel or base.

FRANK L. EAGER.

Witnesses:
JOHN STANFIELD,
THOS. F. LAWLOR.